(12) United States Patent
Ivans et al.

(10) Patent No.: US 10,279,901 B2
(45) Date of Patent: May 7, 2019

(54) ROTATING PROPROTOR ARRANGEMENT FOR A TILTROTOR AIRCRAFT

(71) Applicant: Bell Helicopter Textron Inc., Fort Worth, TX (US)

(72) Inventors: Steven Ray Ivans, Ponder, TX (US); Brent Chadwick Ross, Flower Mound, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 297 days.

(21) Appl. No.: 15/272,062

(22) Filed: Sep. 21, 2016

(65) Prior Publication Data

US 2018/0079503 A1 Mar. 22, 2018

(51) Int. Cl.
| | |
|---|---|
| *B64C 29/00* | (2006.01) |
| *B64C 39/02* | (2006.01) |
| *B64D 27/02* | (2006.01) |
| *B64D 33/02* | (2006.01) |
| *B64D 33/04* | (2006.01) |
| *B64D 35/04* | (2006.01) |

(Continued)

(52) U.S. Cl.
CPC ........ *B64C 29/0033* (2013.01); *B64C 39/024* (2013.01); *B64D 27/02* (2013.01); *B64D 33/02* (2013.01); *B64D 33/04* (2013.01); *B64D 35/04* (2013.01); *B64D 35/08* (2013.01); *F16H 35/008* (2013.01); *B64C 3/18* (2013.01); *B64C 2201/104* (2013.01); *B64C 2201/108* (2013.01); *B64C 2201/165* (2013.01); *F16H 1/203* (2013.01)

(58) Field of Classification Search
CPC ...... B64C 29/0033; B64D 35/04; B64D 35/08
See application file for complete search history.

(56) References Cited

U.S. PATENT DOCUMENTS

| | | | |
|---|---|---|---|
| 2,478,847 | A | 8/1949 | Stuart, III |
| 2,814,451 | A | 11/1957 | Turner et al. |

(Continued)

FOREIGN PATENT DOCUMENTS

| | | |
|---|---|---|
| EP | 2778061 A1 | 9/2014 |
| EP | 2837558 A1 | 2/2015 |

(Continued)

OTHER PUBLICATIONS

European Patent Office, European Search Report for EP Appl. No. 16206787.0 dated Apr. 6, 2017, 5 pp.

*Primary Examiner* — Philip J Bonzell
(74) *Attorney, Agent, or Firm* — Daniel J. Chalker; Edwin S. Flores; Chalker Flores, LLP

(57) ABSTRACT

A propulsion system includes an engine disposed within a fuselage, a first gearbox coupled to the engine, a wing member having an upper wing skin and torque box formed by a first rib, a second rib, a first spar and second spar, a drive shaft coupled to the first gearbox and disposed within the wing member, a second gear box coupled to the drive shaft and disposed outboard from the second rib or inboard from the first rib, and a rotatable proprotor coupled to the second gear box. The rotatable proprotor includes a plurality of rotor blades, a rotor mast having a mast axis of rotation, and a proprotor gearbox coupled to the rotor mast. The proprotor gearbox is rotatable about a conversion axis, which intersects with the mast axis of rotation at a point within a central region of the torque box and above the upper wing skin.

31 Claims, 13 Drawing Sheets

(51) Int. Cl.
   *B64D 35/08*   (2006.01)
   *F16H 35/00*   (2006.01)
   B64C 3/18      (2006.01)
   F16H 1/20      (2006.01)

(56) References Cited

U.S. PATENT DOCUMENTS

| | | | |
|---|---|---|---|
| 3,106,369 A | 10/1963 | Borst | |
| 3,666,209 A | 5/1972 | Taylor | |
| 9,174,731 B2* | 11/2015 | Ross | B64C 29/0033 |
| 9,376,206 B2* | 6/2016 | Ross | B64C 29/0033 |
| 9,663,225 B1* | 5/2017 | Kooiman | B64C 29/0033 |
| 9,701,406 B2* | 7/2017 | Robertson | B64C 29/0033 |
| 9,783,292 B2* | 10/2017 | Kooiman | B64C 29/0033 |
| 9,809,318 B1* | 11/2017 | Williams | B64C 27/22 |
| 9,834,303 B2* | 12/2017 | Bockmiller | B64C 27/22 |
| 9,841,333 B2* | 12/2017 | Ehinger | B64C 27/32 |
| 9,856,029 B2* | 1/2018 | King | B64D 27/26 |
| 9,868,541 B2* | 1/2018 | Kooiman | B64D 27/26 |
| 9,868,542 B2* | 1/2018 | Williams | B64D 27/26 |
| 9,981,750 B2* | 5/2018 | Williams | B64C 27/22 |
| 10,011,349 B2* | 7/2018 | Ivans | B64C 29/0033 |
| 10,029,802 B2* | 7/2018 | Williams | B64D 27/26 |
| 10,040,562 B2* | 8/2018 | Kooiman | B64D 27/26 |
| 10,065,743 B2* | 9/2018 | King | B64D 27/26 |
| 2007/0241228 A1 | 10/2007 | Haynes et al. | |
| 2009/0266941 A1 | 10/2009 | Karem | |
| 2014/0061392 A1 | 3/2014 | Karem | |
| 2014/0263854 A1* | 9/2014 | Ross | B64C 29/0033 244/7 A |
| 2015/0048213 A1* | 2/2015 | Ross | B64C 29/0033 244/7 A |
| 2015/0048214 A1* | 2/2015 | Bockmiller | B64C 27/22 29/889.1 |
| 2015/0360774 A1* | 12/2015 | Covington | B64C 29/0033 244/7 R |
| 2016/0122039 A1* | 5/2016 | Ehinger | B64C 27/32 416/170 R |
| 2016/0229531 A1* | 8/2016 | Robertson | B64C 29/0033 |
| 2017/0158323 A1* | 6/2017 | Ross | B64C 29/0033 |
| 2017/0217594 A1* | 8/2017 | Bacon | B64D 27/26 |
| 2017/0217595 A1* | 8/2017 | Baldwin | B64C 29/0033 |
| 2017/0217596 A1* | 8/2017 | Bacon | B64D 27/26 |
| 2017/0217597 A1* | 8/2017 | Bacon | B64D 27/26 |
| 2017/0217598 A1* | 8/2017 | Bacon | B64D 27/26 |
| 2018/0079490 A1* | 3/2018 | Foskey | B64C 11/28 |
| 2018/0079499 A1* | 3/2018 | Foskey | B64C 3/56 |
| 2018/0079501 A1* | 3/2018 | Foskey | B64C 29/0033 |
| 2018/0079502 A1* | 3/2018 | Foskey | B64C 29/0033 |

FOREIGN PATENT DOCUMENTS

| | | |
|---|---|---|
| EP | 2837559 A1 | 2/2015 |
| WO | 2011018697 A1 | 2/2011 |

\* cited by examiner

ROTATING PROPROTOR ARRANGEMENT FOR A TILTROTOR AIRCRAFT

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of aircraft and more specifically to a rotating proprotor arrangement for a tiltrotor aircraft having a fuselage mounted engine.

BACKGROUND OF THE INVENTION

Without limiting the scope of the invention, its background is described in connection with tiltrotor aircraft.

A conventional tiltrotor aircraft configuration can include a fixed engine with a rotating proprotor; however, conventional packaging arrangements of the fixed engine and the rotating proprotor can have significant shortcomings. Further, the location of the fixed engine and the rotating proprotor in relation to each other, as well as to the wing structure, can have significant influence upon the size and weight of the supporting structure, as well as the complexity of servicing procedures. For example, a rotating proprotor that is cantilevered outboard of the tip end of the wing can require significant structure to adequately support and prevent operationally induced deflection. Further, a rotating proprotor embedded in the wing structure can be difficult and time-consuming to perform maintenance thereon. Likewise supporting the engine at the wingtip in a nacelle can add significant structural weight and complexity to the wing/rotor pylon configuration.

Hence, there is a need for mounting an engine of an aircraft within a fuselage in order to simplify rotor pylon and nacelle configuration, reduce space constraints, and/or reduce aircraft moment of inertia for improved maneuverability.

SUMMARY OF THE INVENTION

The present invention provides a propulsion system for a tiltrotor aircraft that includes an engine disposed within a fuselage, a first gearbox coupled to the engine, a wing member, a drive shaft mechanically coupled to the first gearbox and disposed within the wing member, a second gear box coupled to the drive shaft, and a rotatable proprotor mechanically coupled to the second gear box. The wing member has a first rib, a second rib, a first spar, second spar and an upper wing skin. The first rib, the second rib, the first spar and the second spar are coupled together to form a torque box. The second gear box is disposed either outboard from the second rib or inboard from the first rib. The rotatable proprotor includes a plurality of rotor blades, a rotor mast having a rotor mast axis of rotation, and a proprotor gearbox coupled to the rotor mast. The proprotor gearbox is rotatable about a conversion axis. The conversion axis and the rotor mast axis of rotation intersect at an intersection point, which is located in a central region within the torque box and above an airfoil surface profile of the upper wing skin.

In addition, the present invention provides a tiltrotor aircraft that includes a fuselage, an engine disposed within the fuselage, a first gearbox coupled to the engine, a wing member, a drive shaft mechanically coupled to the first gearbox and disposed within the wing member, a second gear box coupled to the drive shaft, and a rotatable proprotor mechanically coupled to the second gear box. The wing member has a first rib, a second rib, a first spar, second spar and an upper wing skin. The first rib, the second rib, the first spar and the second spar are coupled together to form a torque box. The second gear box is disposed either outboard from the second rib or inboard from the first rib. The rotatable proprotor includes a plurality of rotor blades, a rotor mast having a rotor mast axis of rotation, and a proprotor gearbox coupled to the rotor mast. The proprotor gearbox is rotatable about a conversion axis. The conversion axis and the rotor mast axis of rotation intersect at an intersection point, which is located in a central region within the torque box and above an airfoil surface profile of the upper wing skin.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
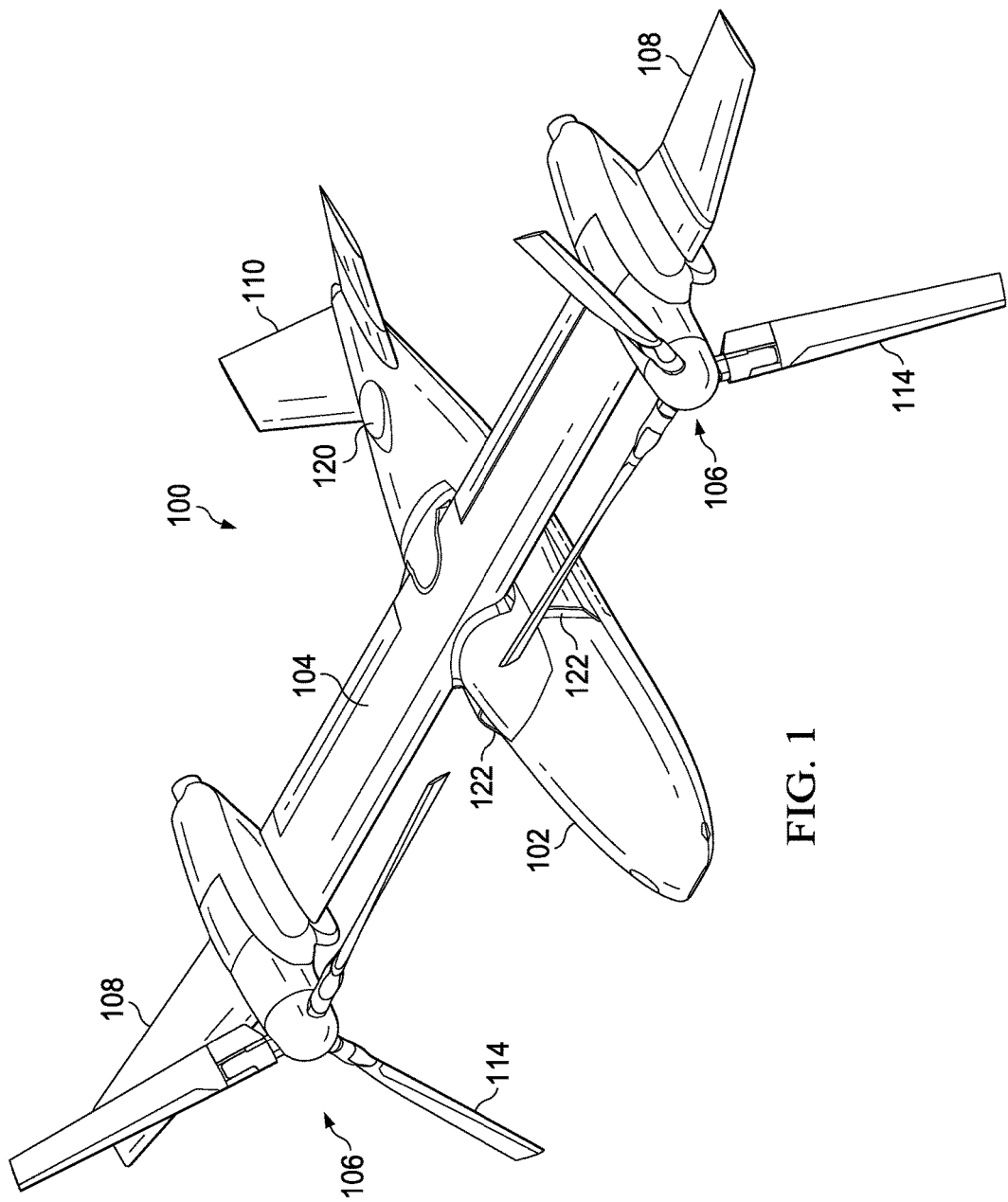
FIG. 1 is a perspective view of a tiltrotor aircraft in airplane mode in accordance with one embodiment of the present invention.
Figure 2:
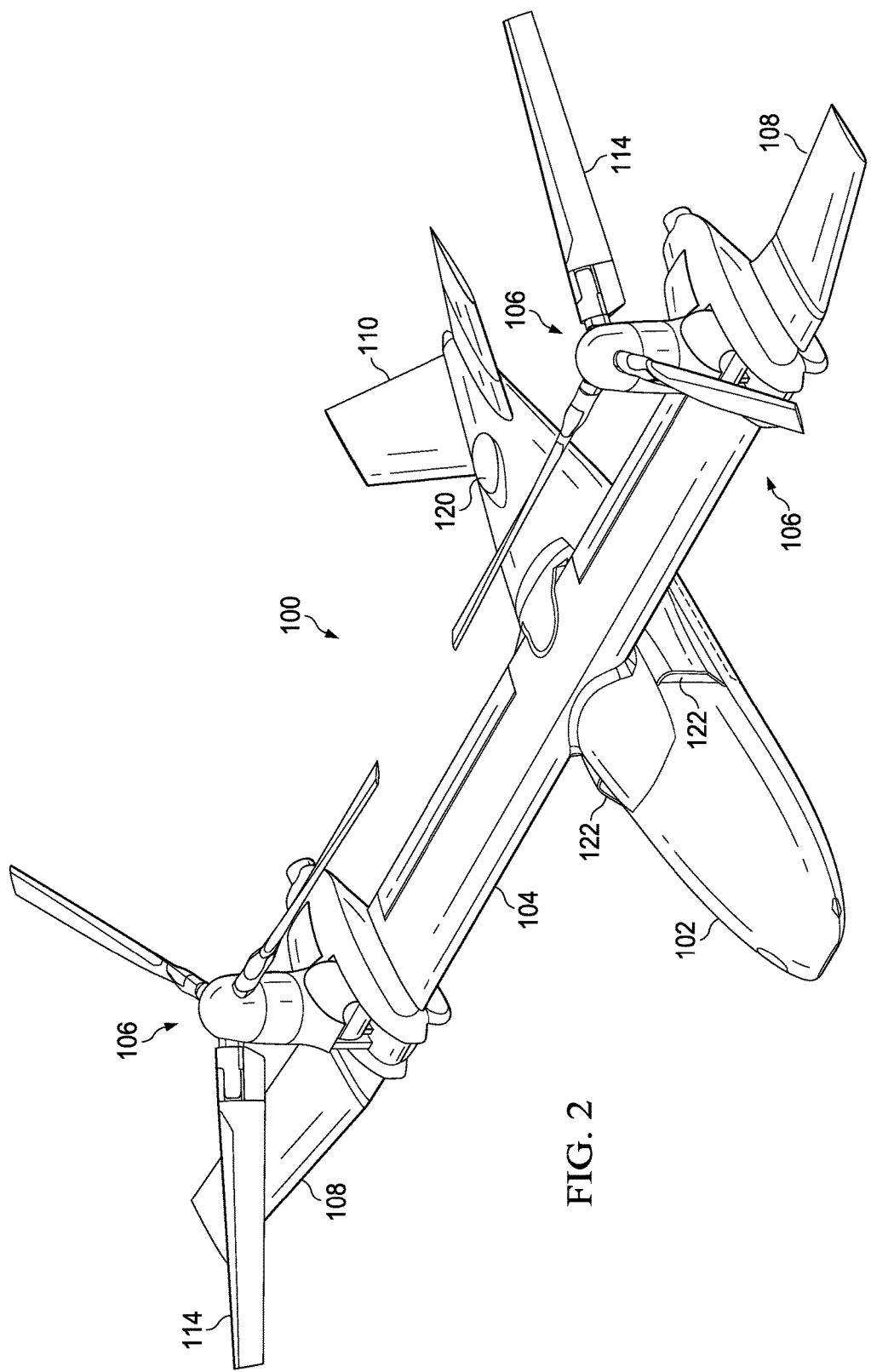
FIG. 2 is a perspective view of a tiltrotor aircraft in helicopter mode in accordance with one embodiment of the present invention.
Figure 7:
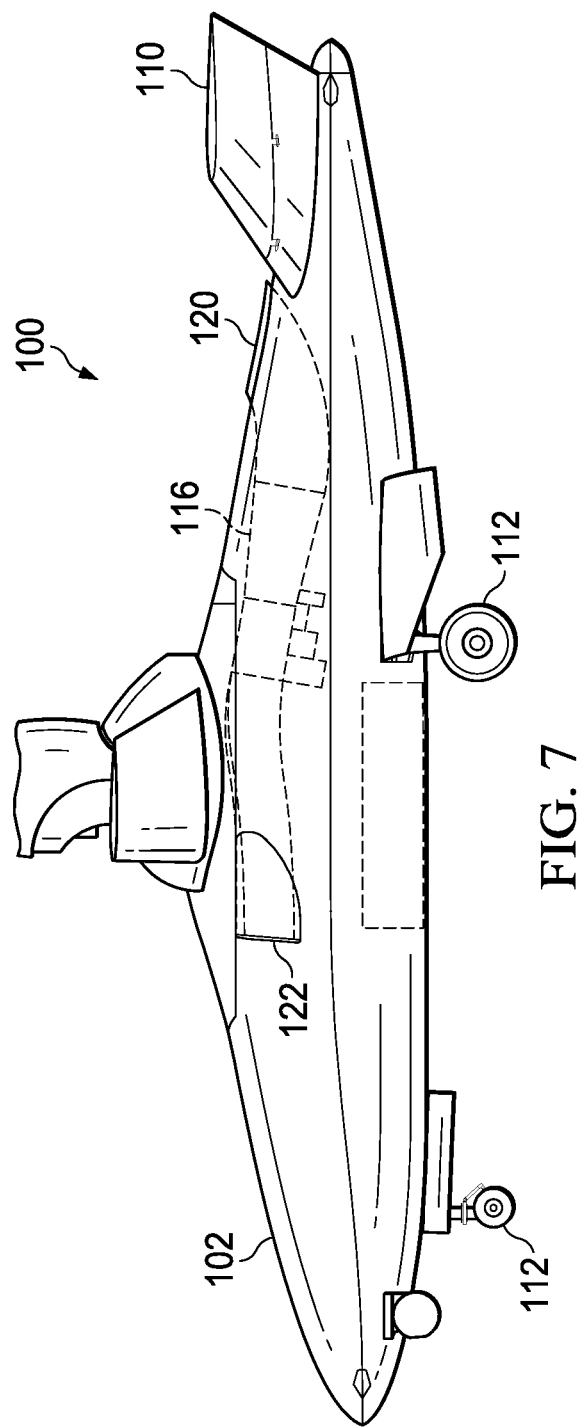
FIG. 7 is a partial side view of a tiltrotor aircraft in accordance with one embodiment of the present invention.

Referring to FIGS. 1-2, an aircraft 100 is illustrated. The aircraft 100 can be a tiltrotor aircraft or unmanned aerial vehicle (UAV). The aircraft 100 includes a fuselage 102, a wing 104, rotatable proprotors 106, wing extensions 108, a tail member 110 and landing gear 112 (FIG. 7). Each rotatable proprotor 106 has a plurality of rotor blades 114 associated therewith. The position of rotatable proprotors 106, as well as the pitch of rotor blades 114, can be selectively controlled in order to selectively control direction, thrust, and lift of aircraft 100. The aircraft 100 is generally operable in a cruise mode as shown in FIG. 1 in which the aircraft 100 orients the rotatable proprotors 106 in a substantially horizontal position to provide a forward thrust in which a lifting force is supplied by wing 104 and wing extensions 108. This cruise mode allows flight in a manner substantially similar to a fixed wing aircraft. The aircraft 100 is also operable in a vertical takeoff and landing (VTOL) mode as shown in FIG. 2 in which the aircraft 100 orients the rotatable proprotors 106 in a substantially vertical position to provide a lifting thrust. This VTOL mode allows flight in a manner substantially similar to a helicopter. In this embodiment, the aircraft 100 can also operate in a transition mode in which the rotatable proprotors 106 can be in any orientation between horizontal and vertical.

In alternative embodiments, the aircraft 100 may not include the wing extensions 108 or the wing extensions 108 could be removable and selectively installed for specific missions, such as long range reconnaissance missions.

Referring now to FIGS. 3-7, the aircraft 100 further comprises an engine 116 and an associated drive system 118A or 118B (FIGS. 4A-4D) configured to drive the rotatable proprotors 106. The engine 116 is disposed within the fuselage 102 and is disposed substantially symmetrically in the left-right direction about a zero butt line (not shown) of the aircraft 100. The zero butt line (not shown) generally bisects the aircraft 100 into left and right portions. The engine 116 is connected to a centrally located exhaust outlet 120 and two air intakes 122. Similar to the engine 116, the exhaust outlet 120 is disposed substantially symmetrically in the left-right direction about the zero butt line (not shown). As alternative embodiments the exhaust outlet, 120 could exhaust to the left or right sides of the aft fuselage or split into a bifurcated duct exhausting symmetrically on either side of the fuselage. However, while the air intakes 122 are not generally centrally located, the air intakes 122 are disposed in a substantially symmetric manner in the left-right direction about the zero butt line (not shown) on the sides of the fuselage 102. In alternative embodiments, the air intakes 122 may also be located on the upper side of the fuselage with dual inlets or as a single inlet duct that bifurcates around the transmission on its way to the engine 116 or a single duct routed to the engine 116.

Figure 3:
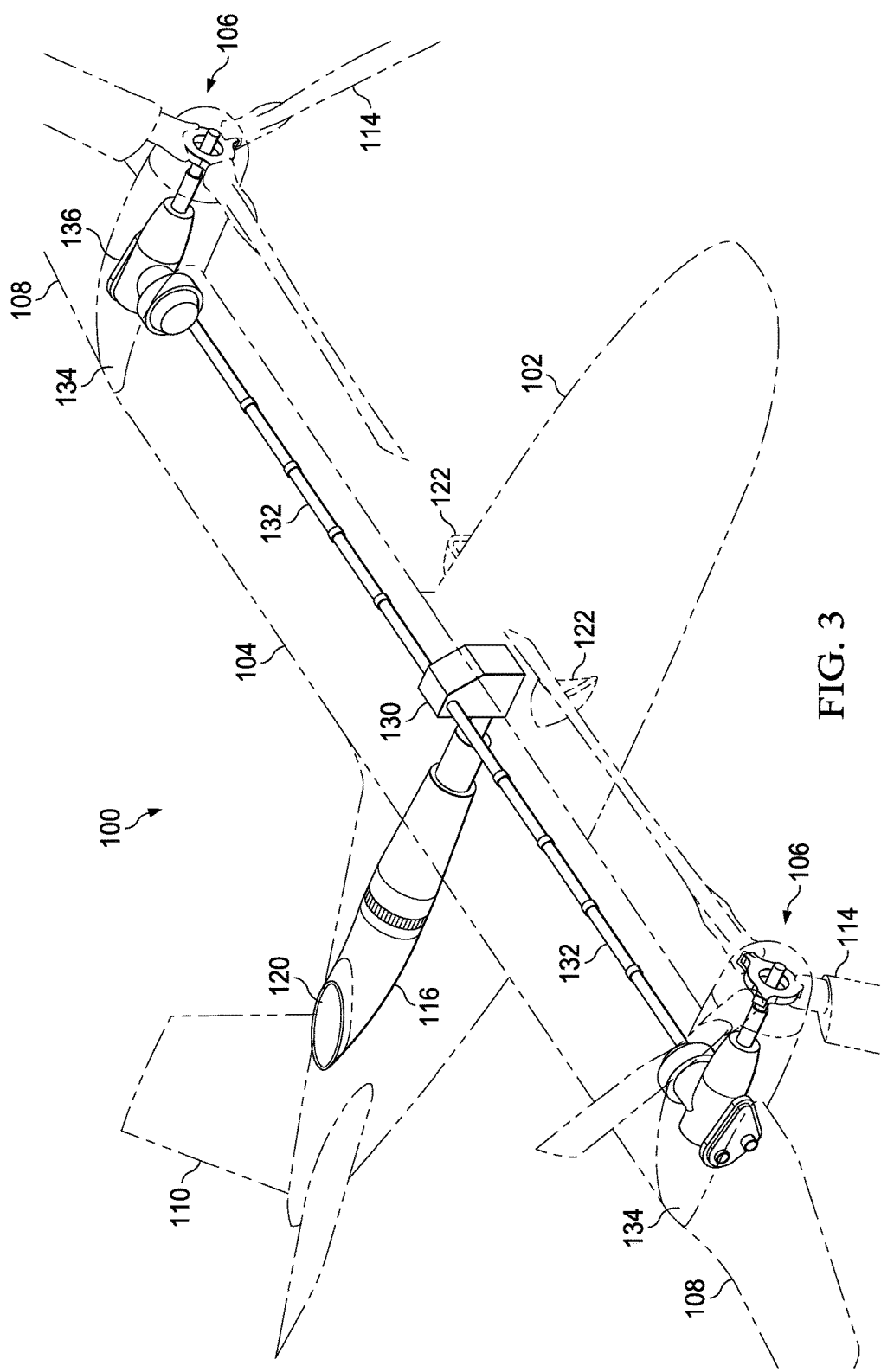
FIG. 3 is a perspective view of a tiltrotor aircraft in airplane mode in accordance with one embodiment of the present invention.
Figure 4A:
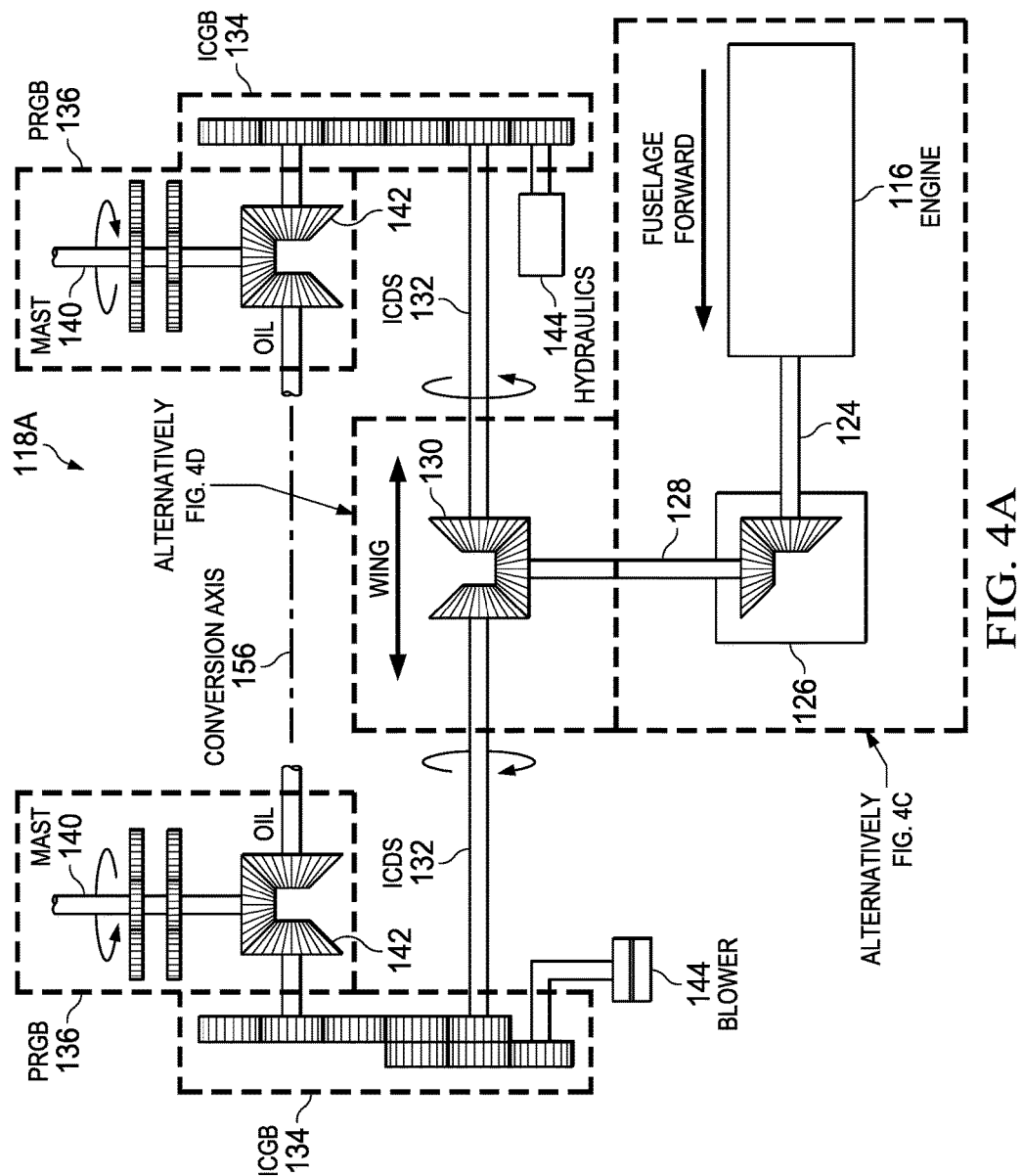
FIGS. 4A-4D are partial schematic diagrams of a drive system in accordance with one embodiment of the present invention.
Figure 4B:
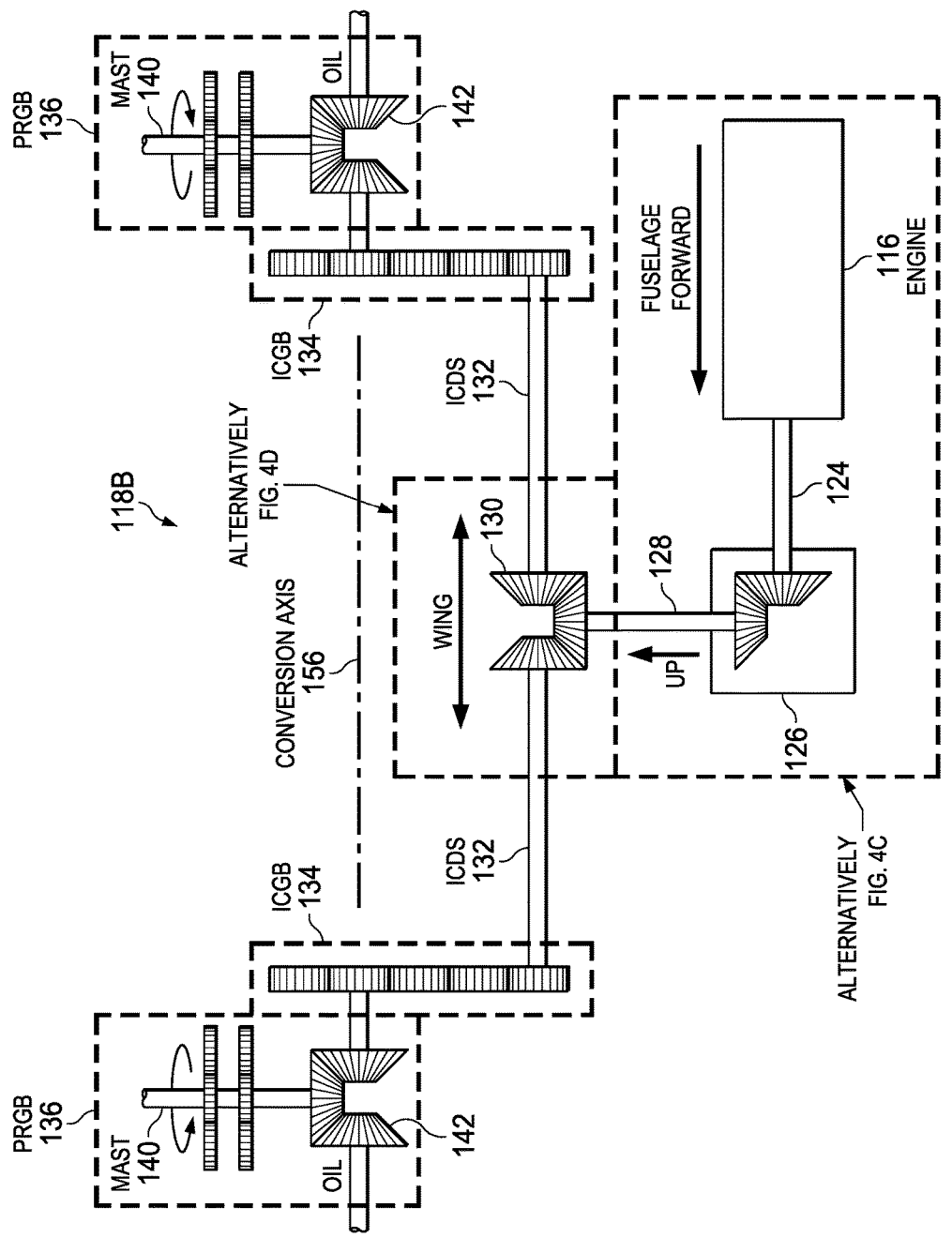
Figure 4C:
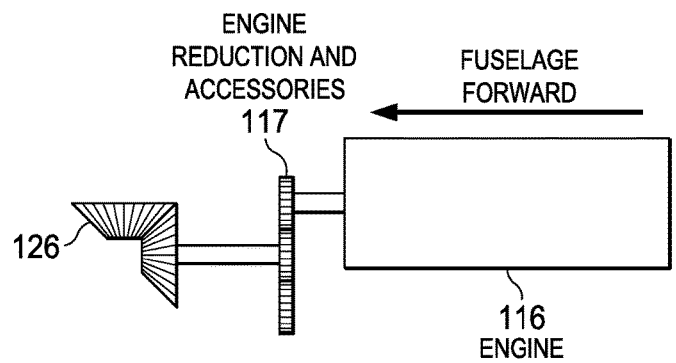
Figure 4D:
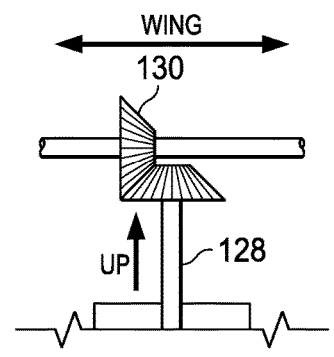

Now referring to FIGS. 3 and 4A-4D, the drive systems 118A and 118B include an engine drive shaft 124 that extends from the engine 116 substantially forward toward the front of the aircraft 100. The engine drive shaft 124 is connected to a direction change gearbox 126 configured to connect the longitudinally extending engine drive shaft 124 to a riser shaft 128 that extends substantially vertically from the direction change gearbox 126. FIG. 4C shows an alternate embodiment where drive shaft 124 extends first to an engine reduction gearbox 117 which reduces shaft rotation speed before gearbox 126 and allows accessories such as generators and hydraulic pumps to be driven. The direction change gearbox 126 may include a clutch (not shown). In this embodiment, the direction change gearbox 126 is configured to transfer rotary motion between the engine drive shaft 124 and the riser shaft 128 despite the right angle between the engine drive shaft 124 and the riser shaft 128. In some embodiments, the direction change gearbox 126 comprises components configured to provide a shaft speed reduction so that the speed of the riser shaft 126 is slower than the speed of the engine drive shaft 124. The drive system 118 also includes a power splitting gearbox 130 (also referred to as a midwing gearbox or first gearbox) configured to receive rotation from the riser shaft 124 and transfer rotary motion to each of two interconnect drive shafts (ICDS) 132 that drive the rotor systems 106 via interconnect gearboxes (ICGB or second gearbox) 134 and proprotor gearboxes 136. FIG. 4D shows an alternative embodiment of the midwing geartrain 130 is shown where the power splitting gearbox 130 is a single spiral bevel gear, rather than the dual spiral bevel gear of FIGS. 4A and 4B (note that the helical geartrain in the interconnect gearbox 134 must include an additional gear on the right side to insure left and right rotor rotate opposite directions). The interconnect gearbox 134 includes a plurality of gears, such as helical gears, in a gear train. Torque is transferred from the interconnect gearbox 134 to the mast 140 of the rotatable proprotor 106 via the proprotor gearbox 136, which can be spiral bevel gears 142, or quill shaft 150 and spindle gearbox 152 as shown in FIGS. 8-11 (see also U.S. Pat. No. 9,174,731 which is hereby incorporated by reference in its entirety). The interconnect gearbox 134, proprotor gearbox 136 or mast 140 can also be used to drive various accessories 144 (e.g. blower, hydraulics, etc.). The interconnect gearbox 134 can be located in an outboard position as shown in FIGS. 3 and 4A or an inboard position as shown in FIG. 4B with respect to the rotatable proprotors 106.

Figure 5A:
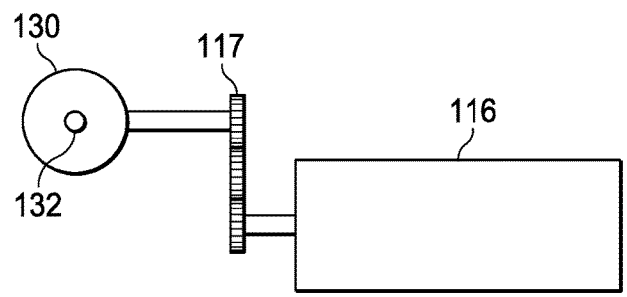
FIGS. 5A-5B are partial schematic diagrams of a side view and top view a drive system in accordance with another embodiment of the present invention.
Figure 5B:
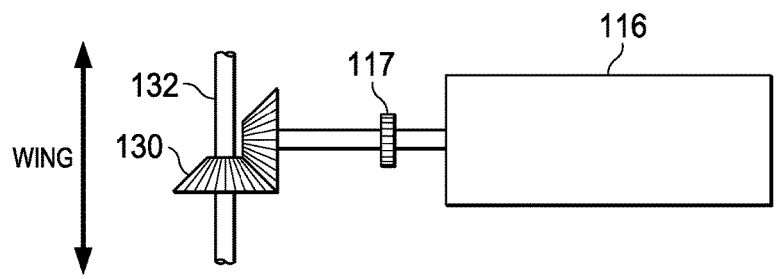
Figure 6:
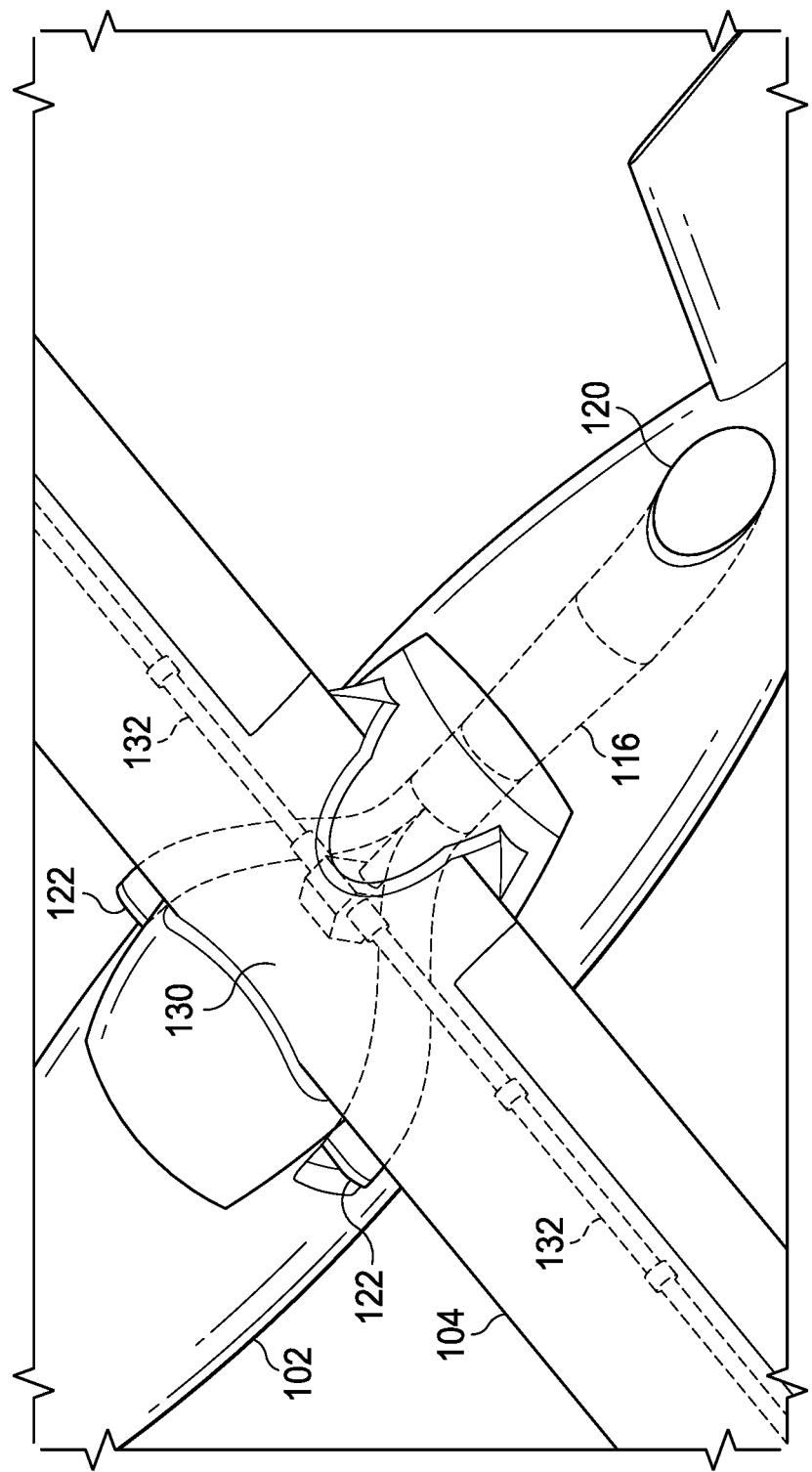
FIG. 6 is a partial perspective view of a drive system in accordance with one embodiment of the present invention.

Referring now to FIGS. 5A and 5B, which are substantially similar to drive systems 118A and 118B of FIGS. 4A and 4B, except the engine 116 connects directly to midwing gearbox 130 with or without the a reduction gearbox 117 which provides a speed reduction and offset from the interconnect driveshaft line of action. In this embodiment, riser 128 and 90 degree gearbox 126 are deleted to allow a more direct attachment of engine without regard to aircraft fold/wing rotation.

Figure 8:
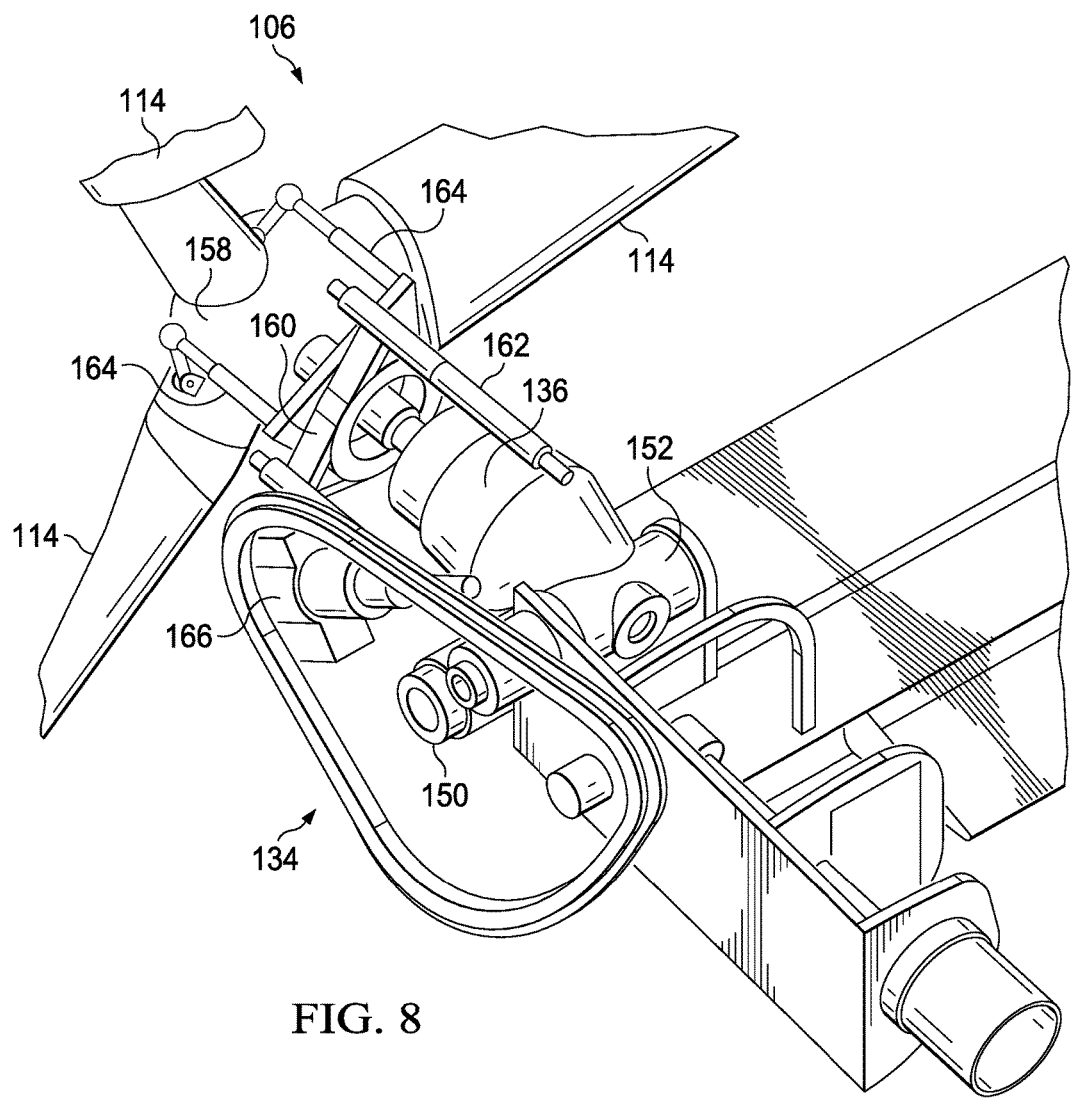
FIG. 8 is a partial perspective view of a propulsion system portion of the tiltrotor aircraft in accordance with one embodiment of the present invention.
Figure 9:
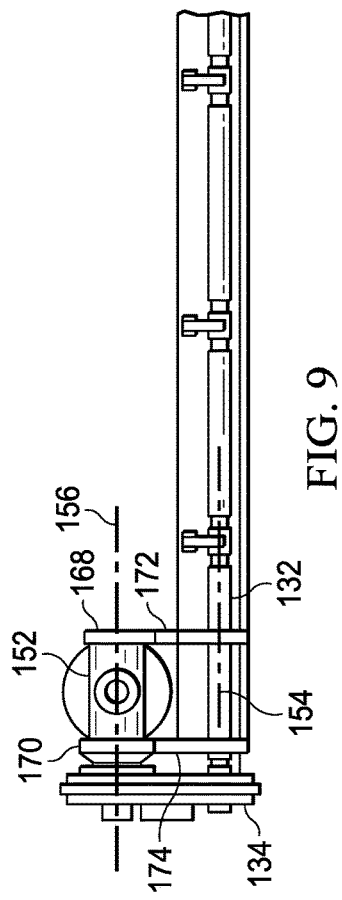
FIG. 9 is a front view of a propulsion system portion of the tiltrotor aircraft in accordance with one embodiment of the present invention.
Figure 10:
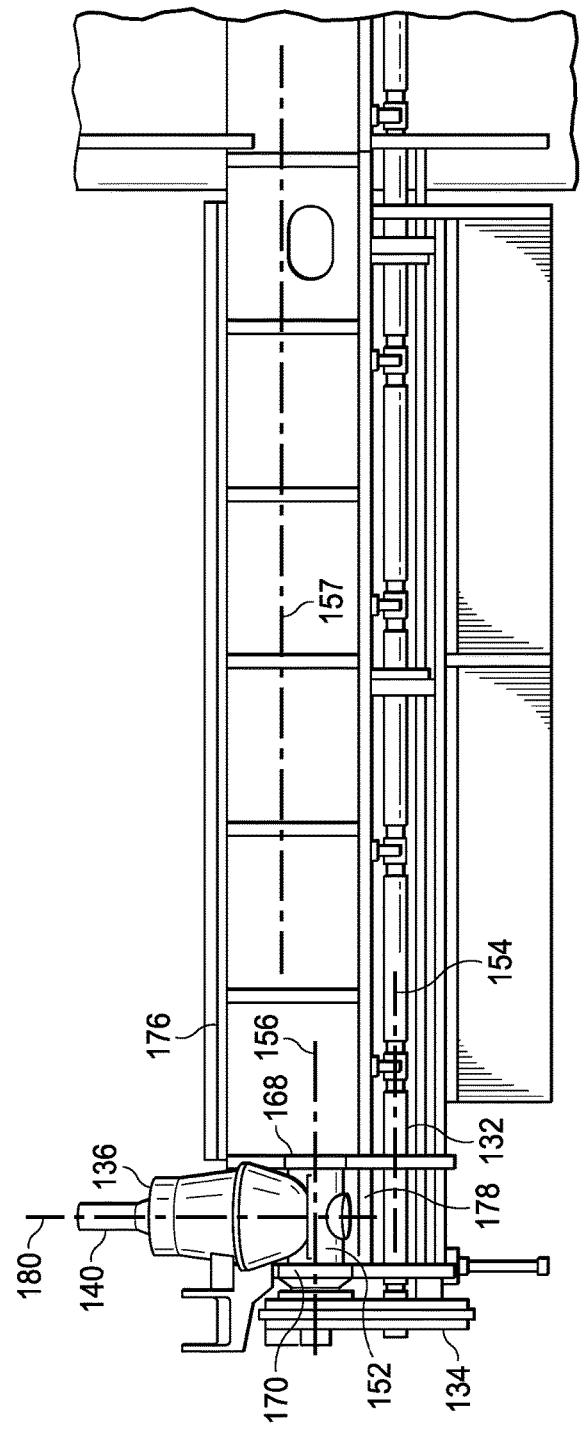
FIG. 10 is a partial top view of the tiltrotor aircraft in accordance with one embodiment of the present invention.

Now referring to FIGS. 8-10, the rotatable proprotor 106 is disclosed in further detail. The interconnect drive shaft 132 transfers power to the interconnect gearbox 134, which includes a plurality of gears, such as helical gears, in a gear train. In one embodiment, torque is transferred from the interconnect gearbox 134 to a quill shaft 150 that in turn transfers the torque to an input in spindle gearbox 152 of proprotor gearbox 136. In the illustrated embodiment, interconnect drive shaft 132 has a rotational axis 154 that is vertically lower and horizontally aft of the conversion axis 156 of the spindle gearbox 152. Conversion axis 156 is parallel to a lengthwise axis 157 of wing 104.

Referring in particular to FIGS. 9 and 10, interconnect drive shaft 132 includes a plurality of segments that share a common rotational axis 154. Location of interconnect drive shaft 132 aft of the aft wing spar 178 provides for optimal integration with interconnect gearbox 134 without interfering with the primary torque transfer in the quill shaft 150 between interconnect gearbox 134 and spindle gearbox 152; as such, the conversion axis 156 of spindle gearbox 152 is parallel to the rotational axis 154 and interconnect drive shaft 132, but located forward and above rotational axis 154.

The rotatable proprotor 106 can include a plurality of rotor blades 114 coupled to a yoke 158. The yoke 158 can be coupled to a mast 140. Mast 140 is coupled to a proprotor gearbox 136. It should be appreciated that rotatable proprotor 106 can include other components, such as a swashplate 160 that is selectively actuated by a plurality of actuators 162 to selectively control the pitch of rotor blades 114 via pitch links 164 (FIG. 8). Proprotor gearbox 136 is configured to transfer power and reduce speed to mast 140. Further, proprotor gearbox 136 provides operational support of rotatable proprotor 106.

During operation, a conversion actuator 166 (shown at least in FIG. 8) can be actuated so as to selectively rotate proprotor gearbox 136 about a conversion axis 156, which in turn selectively positions rotatable proprotor 106 between airplane mode (shown in FIG. 1) and helicopter mode (shown in FIG. 2). The operational loads, such as thrust loads, are transmitted through rotor mast 140 and into the spindle gearbox 152 of proprotor gearbox 136 and thus the structural support of spindle gearbox 152 is critical.

In the illustrated embodiment, the spindle gearbox 152 of proprotor gearbox 136 is mounted to an inboard pillow block 168 with an inboard bearing assembly (not shown). Similarly, spindle gearbox 152 of proprotor gearbox 136 is mounted to an outboard pillow block 170 with an outboard bearing assembly (not shown). Thus, spindle gearbox 152 is structurally supported but rotatable about conversion axis 156 by conversion actuator 166. Inboard pillow block 168 is structurally coupled to an inboard rib 172 (first rib). Similarly, outboard pillow block 170 is structurally coupled to an outboard rib 174 (second rib). In one embodiment, an inboard intermediate support (not shown) is utilized as a structural element between inboard pillow block 168 and inboard rib 172, and an outboard intermediate support (not shown) is similarly utilized as a structural element between outboard pillow block 170 and outboard rib 174. It should be appreciated that the exact structural configuration is implementation specific, and that structural components can be combined and/or separated to meet implementation specific requirements.

Spindle gearbox 152 of proprotor gearbox 136 is located above a surface of an upper wing skin, while also being approximately centered between inboard rib 172 and outboard rib 174. One advantage of locating the proprotor gearbox 136 above the surface of upper wing skin is that the fore/aft location of proprotor gearbox 136 can be easily tailored to align the aircraft center of gravity (CG) with the conversion axis 156 while the rotatable proprotor 106 is in helicopter mode, while also aligning the aircraft center of gravity (CG) with the wing aerodynamic center of lift while the rotatable proprotor 106 is in airplane mode. Because the aircraft center of gravity (CG) shifts as the rotatable proprotor 106 rotates between helicopter mode and airplane mode, the distance from the location of rotatable proprotor 106 in helicopter mode and airplane mode center of lift must correspond. As such, locating proprotor gearbox 136 above the wing (e.g., above an airfoil surface profile of the upper wing skin) allows the exact fore/aft location to be optimized accordingly, while also structurally attaching the proprotor gearbox 136 with in a zone of the torque box formed by coupling the forward wing spar 176 (first spar), aft wing spar 178 (second spar), inboard rib 172, and outboard rib 174 together. The proprotor gearbox 136 is rotatable about a conversion axis 156, the conversion axis 156 and the rotor mast axis of rotation 180 intersecting at an intersection point, the intersection point being located in a central region within the torque box.

The location of the spindle gearbox 152 portion of proprotor gearbox 136 provides an efficient structural support for enduring operational loads by being mounted to inboard rib 172 and outboard rib 174, which together with a forward wing spar 176 and an aft wing spar 178, form a structural torque box. For example, when aircraft 100 is in helicopter mode, torque about mast axis 180 is reacted by the torque box collectively formed by inboard rib 172, outboard rib 174, forward wing spar 176, and aft wing spar 178. It should be noted that location of spindle gearbox 152 of proprotor gearbox 136 also positions the mast axis 180, while in helicopter mode, inboard of outboard rib 174, outboard of inboard rib 172, forward of aft spar 178, and aft of forward spar 176, which allows the axis of the torque to be inside of the torque box structure, rather than cantilevered outside of the torque box structure. In contrast, a spindle gearbox location outside (such as outboard, forward, or aft) would cause a moment that would increase operational loading, thus requiring heavier and less efficient structural support.

Figure 11:
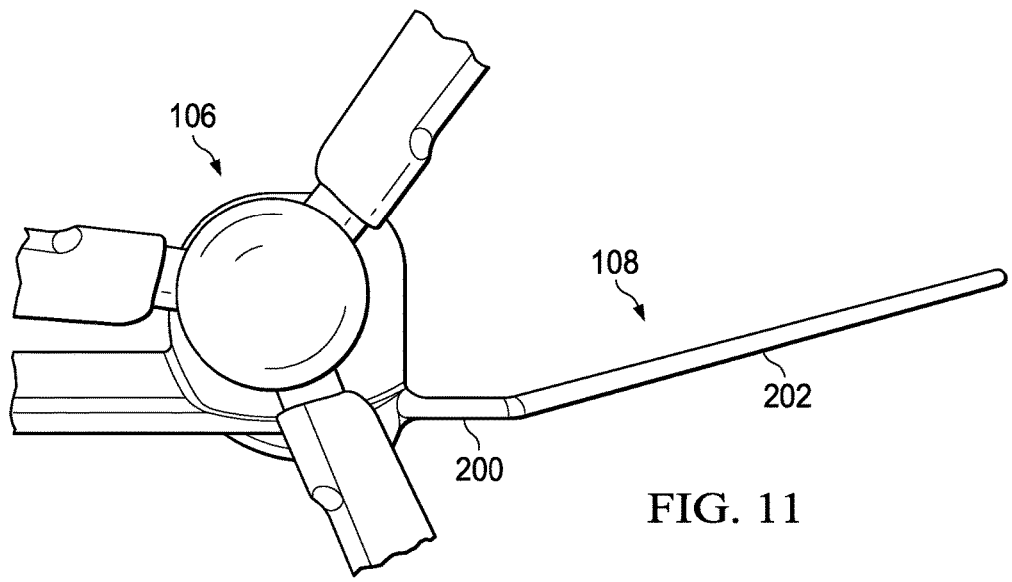
FIGS. 11-13 are various views of a fixed wing extension in accordance with one embodiment of the present invention.
Figure 12:
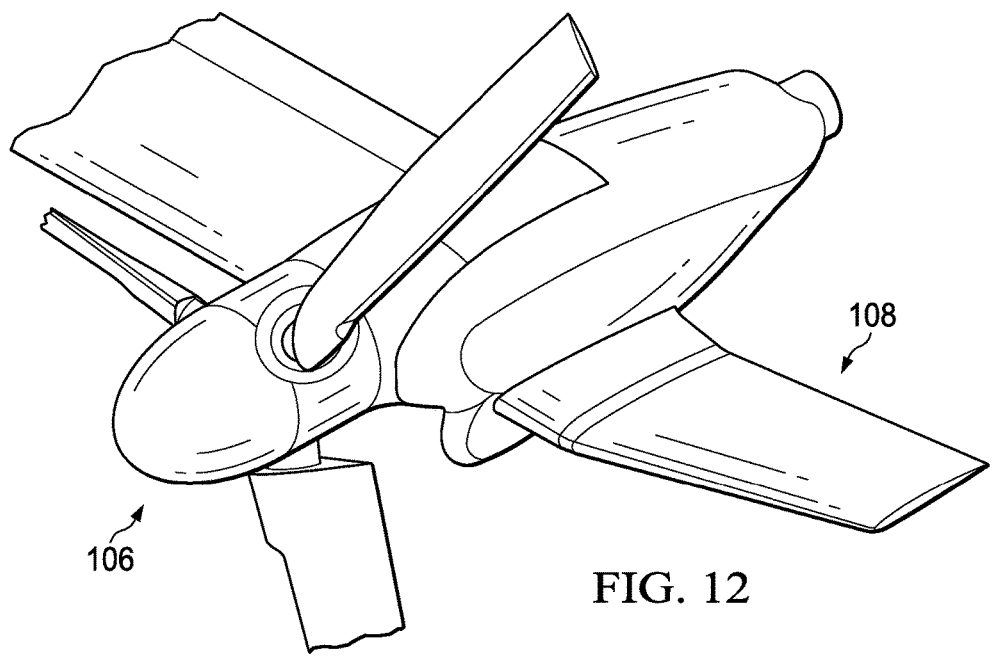
Figure 13:
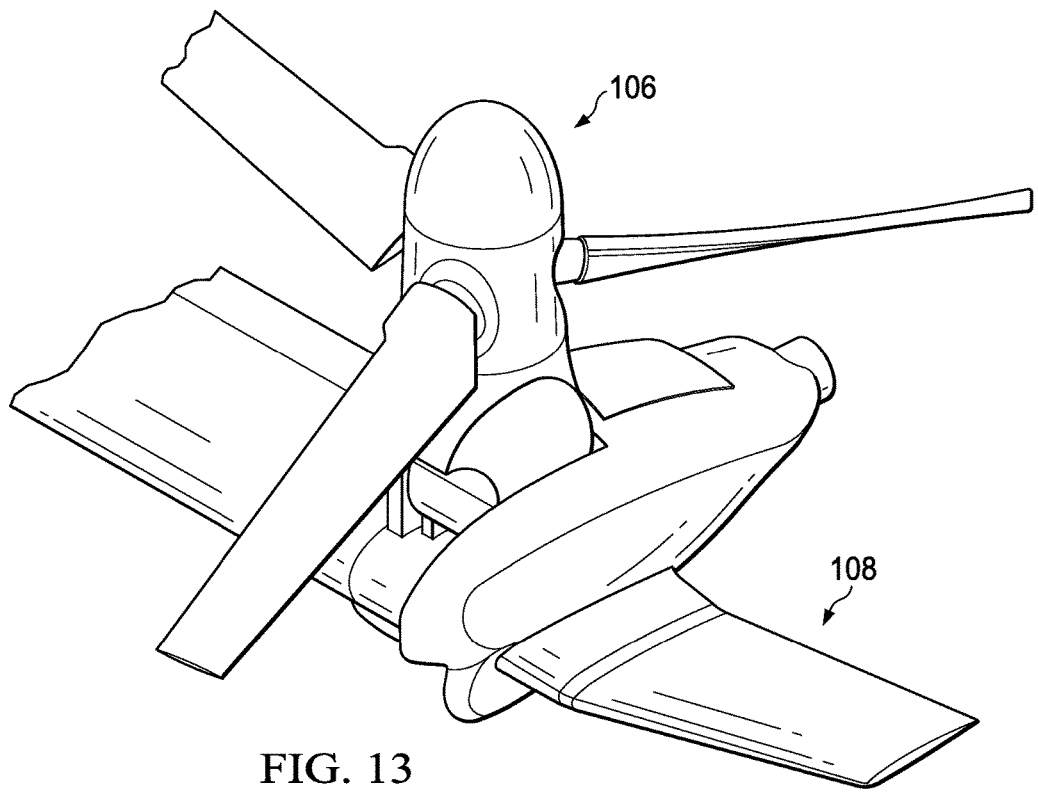

Referring now to FIGS. 11-13, the wing extension 108 having a fixed position is shown in greater detail. More specifically, FIG. 11 shows a front view of the rotatable proprotor 106 in airplane mode with the wing extension 108 in a fixed position. As shown, the wing extension 108 includes a first portion 200 having an orientation that is similar to that of the wing 104 and a second portion 202 that is canted slightly upwards. Alternatively, the wing extension 108 does not have to be canted and can be substantially straight with respect to the orientation of the wing 108. Moreover, the wing extension 108 can be dihedral shaped. FIG. 12 shows a perspective view of the rotatable proprotor 106 in airplane mode with the wing extension 108 in a fixed position. FIG. 13 shows a perspective view of the rotatable proprotor 106 in helicopter mode with the wing extension 108 in a fixed position. In another embodiment, the wing extension 108 is upwardly foldable to reduce to footprint of the aircraft 100 for storage. In some embodiments, manual pinning and folding/unfolding of the wing extensions 108 can be utilized. However, in alternative embodiments, automated and/or automatic locking/unlocking and folding/unfolding may be utilized.

Figure 14:
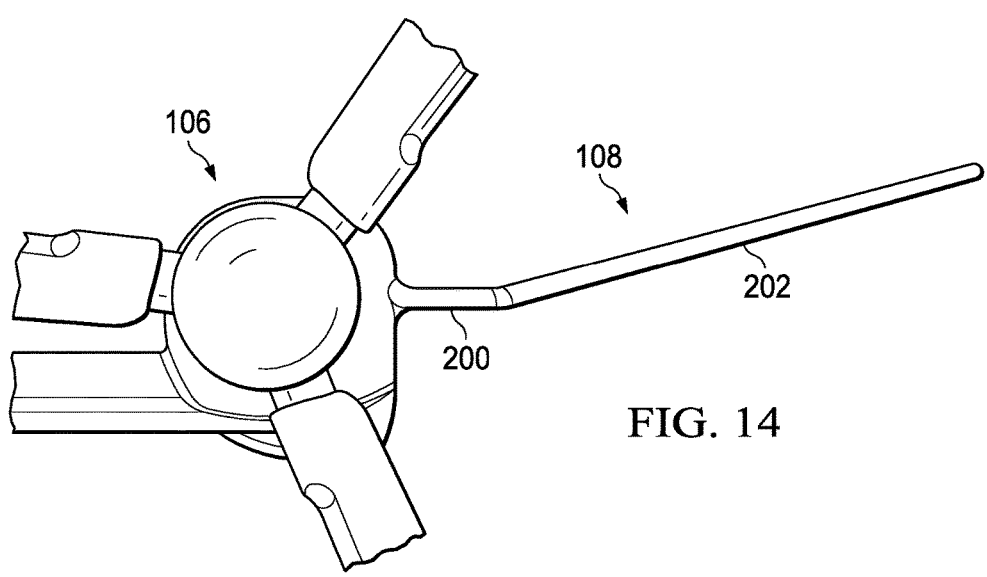
FIGS. 14-16 are various views of a rotatable wing extension in accordance with one embodiment of the present invention.
Figure 15:
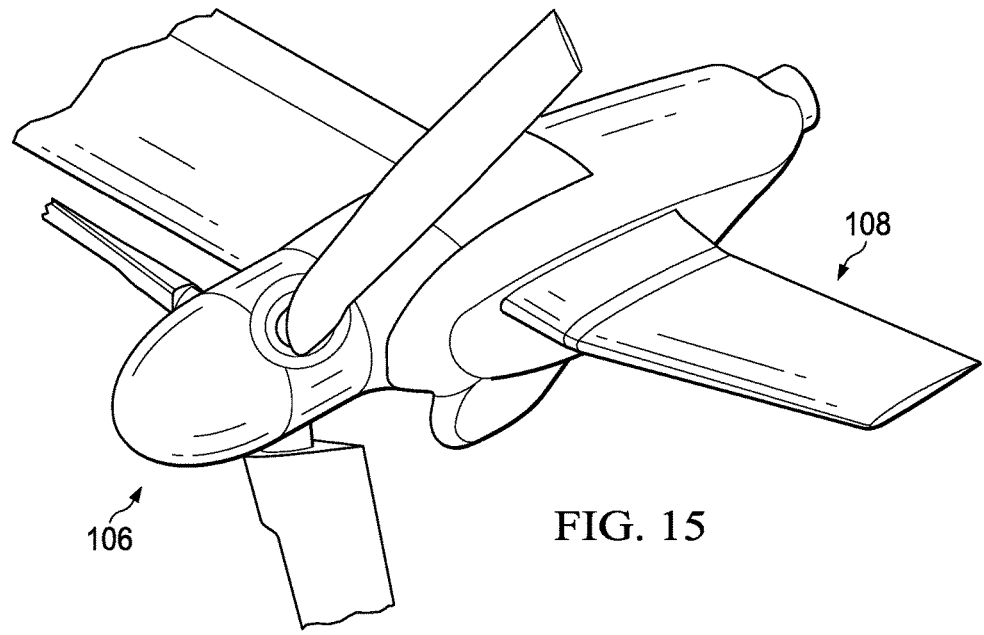
Figure 16:
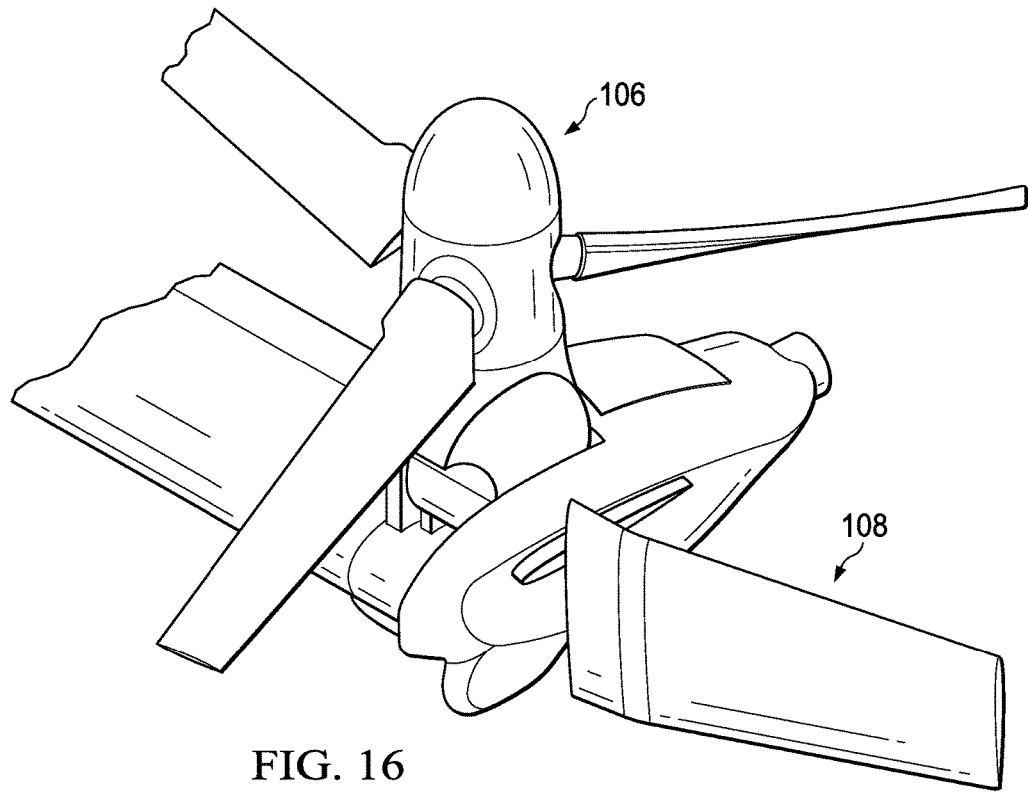

Referring now to FIGS. 14-16, the wing extension 108 having a rotatable position corresponding to the rotatable proprotor 106 is shown in greater detail. More specifically, FIG. 14 shows a front view of the rotatable proprotor 106 in airplane mode with the wing extension 108 in a corresponding airplane mode position. As shown, the wing extension 108 includes a first portion 200 having an orientation that is similar to that of the wing 104 and a second portion 202 that is canted slightly upwards. Alternatively, the wing extension 108 does not have to be canted and can be substantially straight with respect to the orientation of the wing 108. Moreover, the wing extension 108 can be dihedral shaped. FIG. 15 shows a perspective view of the rotatable proprotor 106 in airplane mode with the wing extension 108 in a corresponding airplane mode position. FIG. 16 shows a perspective view of the rotatable proprotor 106 in helicopter mode with the wing extension 108 in a corresponding helicopter mode position.

The wing extension 108 includes at least one mount connected to the interconnect gearbox 134 or proprotor gearbox 136 associated with drive system 118 or 138 such that winglet 108 rotates about the conversion axis 156. Rotatable wing extensions 108 increase cruise efficiency without increasing rotor download excessively in hover, while still allowing the aircraft 100 the ability to fold and fit into confined spaces. The wing extensions 108 are generally horizontal when the aircraft 100 is in a cruise configuration. Because the wing extensions 108 are generally vertical in hover or VTOL configurations, the wing extensions 108 are generally streamline with the rotor system 106 thrust direction. The wing extension 108 does not attach directly to structural components of the wing 104, but rather, attach to components carried in the rotatable proprotor 106.

In another embodiment, the wing extension 108 is upwardly foldable from the airplane mode position or aft foldable from the helicopter mode to reduce to footprint of the aircraft 100 for storage. In some embodiments, manual pinning and folding/unfolding of the wing extensions 108 can be utilized. However, in alternative embodiments, automated and/or automatic locking/unlocking and folding/unfolding may be utilized.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A propulsion system for a tiltrotor aircraft having two rotatable proprotors, the propulsion system comprising:
   an engine disposed within a fuselage;
   a wing member having a first rib, a second rib, a first spar, second spar and an upper wing skin, wherein the first rib, the second rib, the first spar and the second spar are coupled together to form a torque box proximate to each end of the wing member;
   a first gearbox disposed midwing and coupled to the engine;
   two second gear boxes, each second gear box for one of the rotatable proprotors and disposed either outboard from its respective second rib or inboard from its respective first rib;
   two drive shafts disposed within the wing member, each drive shaft mechanically coupling the first gearbox to one of the second gear boxes;
   each of the two rotatable proprotors mechanically coupled to one of the second gear boxes, each rotatable proprotor comprising:
      a plurality of rotor blades;
      a rotor mast having a rotor mast axis of rotation; and
      a proprotor gearbox coupled to the rotor mast, the proprotor gearbox being rotatable about a conversion axis, the conversion axis and the rotor mast axis of rotation intersecting at an intersection point, the intersection point being located in a central region within its respective torque box and above an airfoil surface profile of the upper wing skin.

2. The propulsion system as recited in claim 1, wherein the engine is disposed forward of the wing member, under the wing member or aft of the wing member.

3. The propulsion system as recited in claim 1, wherein the engine comprises two engines.

4. The propulsion system as recited in claim 1, further comprising an exhaust connected to the engine and extending to an upper portion of the fuselage aft of the wing member.

5. The propulsion system as recited in claim 1, further comprising an exhaust connected to the engine and extending to either side of the fuselage aft of the wing member.

6. The propulsion system as recited in claim 1, further comprising an inlet connected to the engine and blended into each side of the fuselage.

7. The propulsion system as recited in claim 1, further comprising an inlet connected to the engine and blended into a forward facing upper surface of the fuselage.

8. The propulsion system as recited in claim 1, wherein the conversion axis is parallel to a lengthwise axis of the wing member.

9. The propulsion system as recited in claim 1, further comprising:
   a direction change gearbox coupled to the engine; and
   a riser shaft coupled to the direction change gearbox and the first gearbox.

10. The propulsion system as recited to claim 1, wherein the first gearbox comprises a single spiral bevel gear or a dual spiral bevel gear.

11. The propulsion system as recited in claim 1, wherein:
   the second gearbox comprises an interconnect gearbox; and
   the proprotor gearbox comprises a single spiral bevel gear, or a quill shaft and a spindle gearbox.

12. The propulsion system as recited in claim 1, further comprising:
   an outboard housing;
   an inboard housing; and
   wherein an outboard portion of the proprotor gearbox is rotatably coupled to the outboard housing, and the inboard portion of the proprotor gearbox is rotatably coupled to the inboard housing.

13. The propulsion system as recited in claim 12, wherein the inboard housing and the outboard housing are structurally located above the upper wing skin of the wing member.

14. The propulsion system as recited in claim 1, wherein the tiltrotor aircraft comprises an unmanned aerial vehicle.

15. A tiltrotor aircraft, comprising:
   a fuselage;
   an engine disposed within the fuselage;
   a wing member having a first rib, a second rib, a first spar, second spar and an upper wing skin, wherein the first rib, the second rib, the first spar and the second spar are coupled together to form a torque box proximate to each end of the wing member;
   a first gearbox disposed midwing and coupled to the engine;
   two second gear boxes, each second gear box for one of the rotatable proprotors and disposed either outboard from its respective second rib or inboard from its respective first rib;
   two drive shafts disposed within the wing member, each drive shaft mechanically coupling the first gearbox to one of the second gear boxes;
   each of the two rotatable proprotors mechanically coupled to one of the second gear boxes, each rotatable proprotor comprising:
      a plurality of rotor blades;
      a rotor mast having a rotor mast axis of rotation; and
      a proprotor gearbox coupled to the rotor mast, the proprotor gearbox being rotatable about a conversion axis, the conversion axis and the rotor mast axis of rotation intersecting at an intersection point, the intersection point being located in a central region within its respective torque box and above an airfoil surface profile of the upper wing skin.

16. The tiltrotor aircraft as recited in claim 15, wherein the engine is disposed forward of the wing member, under the wing member or aft of the wing member.

17. The tiltrotor aircraft as recited in claim 15, wherein the engine comprises two engines.

18. The tiltrotor aircraft as recited in claim 15, further comprising an exhaust connected to the engine and extending to an upper portion of the fuselage aft of the wing member.

19. The tiltrotor aircraft as recited in claim 15, further comprising an exhaust connected to the engine and extending to either side of the fuselage aft of the wing member.

20. The tiltrotor aircraft as recited in claim 15, further comprising an inlet connected to the engine and blended into each side of the fuselage.

21. The tiltrotor aircraft as recited in claim 15, further comprising an inlet connected to the engine and blended into a forward facing upper surface of the fuselage.

22. The tiltrotor aircraft as recited in claim 15, wherein the conversion axis is parallel to a lengthwise axis of the wing member.

23. The tiltrotor aircraft as recited in claim 15, further comprising:
a direction change gearbox coupled to the engine; and
a riser shaft coupled to the direction change gearbox and the first gearbox.

24. The tiltrotor aircraft as recited to claim 15, wherein the first gearbox comprises a single spiral bevel gear or a dual spiral bevel gear.

25. The tiltrotor aircraft as recited in claim 15, wherein:
the second gearbox comprises an interconnect gearbox; and
the proprotor gearbox comprises a single spiral bevel gear, or a quill shaft and a spindle gearbox.

26. The tiltrotor aircraft as recited in claim 15, further comprising:
an outboard housing;
an inboard housing; and
wherein an outboard portion of the proprotor gearbox is rotatably coupled to the outboard housing, and the inboard portion of the proprotor gearbox is rotatably coupled to the inboard housing.

27. The tiltrotor aircraft as recited in claim 26, wherein the inboard housing and the outboard housing are structurally located above the upper wing skin of the wing member.

28. The tiltrotor aircraft as recited in claim 15, further comprising a wing extension extending outboard from the rotatable proprotor.

29. The tiltrotor aircraft as recited in claim 28, wherein the wing extension includes a straight portion and an upwardly canted portion.

30. The tiltrotor aircraft as recited in claim 28, wherein the wing extension is rotatable or foldable.

31. The tiltrotor aircraft as recited in claim 15, wherein the tiltrotor aircraft comprises an unmanned aerial vehicle.

* * * * *